US 6,724,186 B2

(12) United States Patent
Jordil

(10) Patent No.: US 6,724,186 B2
(45) Date of Patent: Apr. 20, 2004

(54) MEASURING DEVICE WITH MAGNETO-RESISTIVE ELECTRODES, AND MEASURING METHOD

(75) Inventor: Pascal Jordil, Ecoteaux (CH)

(73) Assignee: Brown & Sharpe TESA SA, Renens (CH)

(*) Notice: Subject to any disclaimer, the term of this patent is extended or adjusted under 35 U.S.C. 154(b) by 0 days.

(21) Appl. No.: 10/330,999

(22) Filed: Dec. 27, 2002

(65) Prior Publication Data
US 2003/0128028 A1 Jul. 10, 2003

Related U.S. Application Data

(63) Continuation of application No. PCT/CH00/00348, filed on Jun. 27, 2002.

(51) Int. Cl.[7] .................................................. G01B 7/14
(52) U.S. Cl. ........................ 324/207.21; 324/207.24; 33/708
(58) Field of Search ................ 324/207.16, 207.17, 324/207.2, 207.21, 207.24; 33/708, 784, 819, 820

(56) References Cited

U.S. PATENT DOCUMENTS 5,386,642 A * 2/1995 Spies et al. ................... 33/708
5,619,132 A * 4/1997 Spies ....................... 324/207.21
5,949,051 A * 9/1999 Kiriyama ..................... 235/449
6,011,390 A * 1/2000 Loreit et al. .............. 324/207.21
6,054,851 A * 4/2000 Masreliez et al. ........ 324/207.17
6,191,578 B1 * 2/2001 Bezinge et al. ........... 324/207.21
6,229,301 B1 * 5/2001 Bolli et al. ................ 324/207.21
6,291,907 B1 * 9/2001 Haigh et al. .................... 307/91
6,332,278 B1 * 12/2001 Bezinge et al. ............... 33/784

FOREIGN PATENT DOCUMENTS

DE         4233331 A1 *  4/1994  ............ G01B/7/02
JP         59142403 A  *  8/1984  ............ G01B/7/02
JP         61173113 A  *  8/1986  ............ G01D/5/18

* cited by examiner

Primary Examiner—N. Le
Assistant Examiner—Darrell Kinder
(74) Attorney, Agent, or Firm—Pearne & Gordon LLP

(57) ABSTRACT

Electronic circuit for dimension-measuring device with magneto-resistive electrodes supplying at least one feed voltage for feeding a network of magneto-resistive electrodes and a measuring circuit comprising two differential inputs connected to the network. The measuring circuit uses a rough counter and a fine interpolation circuit for determining from the two sinusoidal input signals received the position of the sensor along the scale. The feed circuit periodically reduces the supplied electric feed voltage so as to temporarily lessen the dissipation of energy in the magneto-resistive electrodes.

22 Claims, 4 Drawing Sheets

MEASURING DEVICE WITH MAGNETO-RESISTIVE ELECTRODES, AND MEASURING METHOD

This application is a continuation of PCT application PCT/CH00/00348 (WO0201144) filed on Jun. 27, 2002, the content of which is hereby incorporated.

FIELD OF THE INVENTION

The present invention concerns a dimension-measuring device with magneto-resistive electrodes, and a method for measuring dimensions by means of such a device.

RELATED ART

Electronic devices for measuring length or angular position in industry for example must generally satisfy several partially contradictory requirements. They must furnish sufficient precision and resolution and be usable in environments subject to vibrations or to pollution such as dust, oil or humidity. Also expected of such sensors are easy integration into small-size apparatus, without significant adjustment or adaptation, high-speed measurement and low power consumption at the lowest possible cost.

Different types of measuring devices, based upon different physical principles, have been developed to satisfy these various requirements. In particular, measuring systems utilizing capacitance variations caused by the movement of a sensor opposite a scale have been used abundantly in portable devices such as calipers for example. These devices must be kept clean enough to function and are thus poorly adapted to operating in an environment that is humid or subject to the spraying of lubricant or cutting oil for example. Devices for measuring length based upon the principle of magneto-resistive electrodes have been proposed, for example in patent document DE4233331 (IMO), that offer much greater resistance to soiling. The device described in this document comprises a sensor provided with a network of magneto-resistive electrodes connected so as to define two Wheatstone bridges. The sensor is mounted on a slide and can be moved opposite a magnetized scale with a magnetization period $\lambda$. Movement of the sensor opposite the scale causes a modification of the magnetic field applied on the various magneto-resistive electrodes of the sensor and thus a change in their resistance. By applying a voltage to the Wheatstone bridges, one gathers at their outputs an electric signal being a periodic function of the position of the sensor along the scale.

The two Wheatstone bridges are constituted of four magneto-resistive electrodes phase-shifted by $\lambda/2$. The corresponding electrodes of each bridge occupy positions phase-shifted by $\lambda/4$. The electrodes of the two measuring bridges are intermixed. The aforementioned document further suggests the use of barberpole structures, which allow the direction of the current vector I to be modified. As the resistance of a magneto-resistive electrode is a function of the angle between the magnetization vector and the current vector, the barberpole structures make it possible to control the direction and amplitude of the variation in resistance of the electrodes caused by the movement of the sensor.

Each branch of the Wheatstone bridge is constituted of a single magneto-resistive electrode whose width must be sufficient to react to the relatively small magnetic fields generated by the scale. The resistance of the branches of the bridge is thus reduced, and substantial currents circulate across the measuring bridges. The power consumption of this device is consequently high.

The patent document U.S. Pat. No. 5,386,642 (Heidenhain) describes a sensor in which the electrodes are organized into measuring bridges, each branch of which is constituted of several magneto-resistive electrodes of the same phase and connected in series. The resistance of the branches of the bridge is thus greater, which allows the power consumption to be appreciably reduced. However, the consumption of this type of sensor remains too high to contemplate its use in electrically autonomous apparatus, for example in portable precision calipers.

The patent document JP-01-212313-A describes an electronic circuit capable of being used in a dimension-measuring device with magneto-resistive electrode, in which the magneto-resistive electrodes are fed with continuous power supplies.

The patent document JP-A-61-173113 describes a new way of connecting the magneto-resistive electrodes in a device for measuring angular dimension, in order to reduce the power consumption. The reduction in consumption is due to a particular connection of the electrodes.

Document EP0924491, the content of which is hereby incorporated by reference, describes an electronic circuit for a dimension-measuring device of the magneto-resistive type, in which the feeding of the measuring bridges is periodically reduced or interrupted, so as to lessen the dissipation of energy in the magneto-resistive electrodes. By feeding the measuring bridges with a cycle ratio of 1/n, it is thus possible to divide by n the electric consumption in the electrodes.

This circuit also describes a standby-mode circuit enabling the electric consumption to be reduced when the device is not used. In stand-by mode, the display and circuit controller are switched off, the reading of the measurement is thus impossible. These components are then reactivated when a movement of the sensor is detected by means of the magneto-resistive electrodes that must remain under tension.

The standby mode described in EP0924491 is thus not very advantageous, since the device in standby is unusable for displaying measurements but nevertheless continues to use considerably current for feeding the magneto-resistive electrodes.

An aim of this invention is to realize a measuring device with magneto-resistive electrodes different from the prior-art devices and having an electric consumption that is equal or lower.

In particular, an aim of the present invention is to realize a portable measuring such as a battery-powered slide caliper.

BRIEF SUMMARY OF THE INVENTION

According to the invention, these aims are achieved by means of a circuit having the elements of the independent claim, alternative embodiments being furthermore indicated in the dependent claims.

DESCRIPTION OF THE DRAWINGS

The invention will be better understood by reading the description given by way of example and illustrated by the following figures.

DETAILED DESCRIPTION OF THE INVENTION

Figure 1:
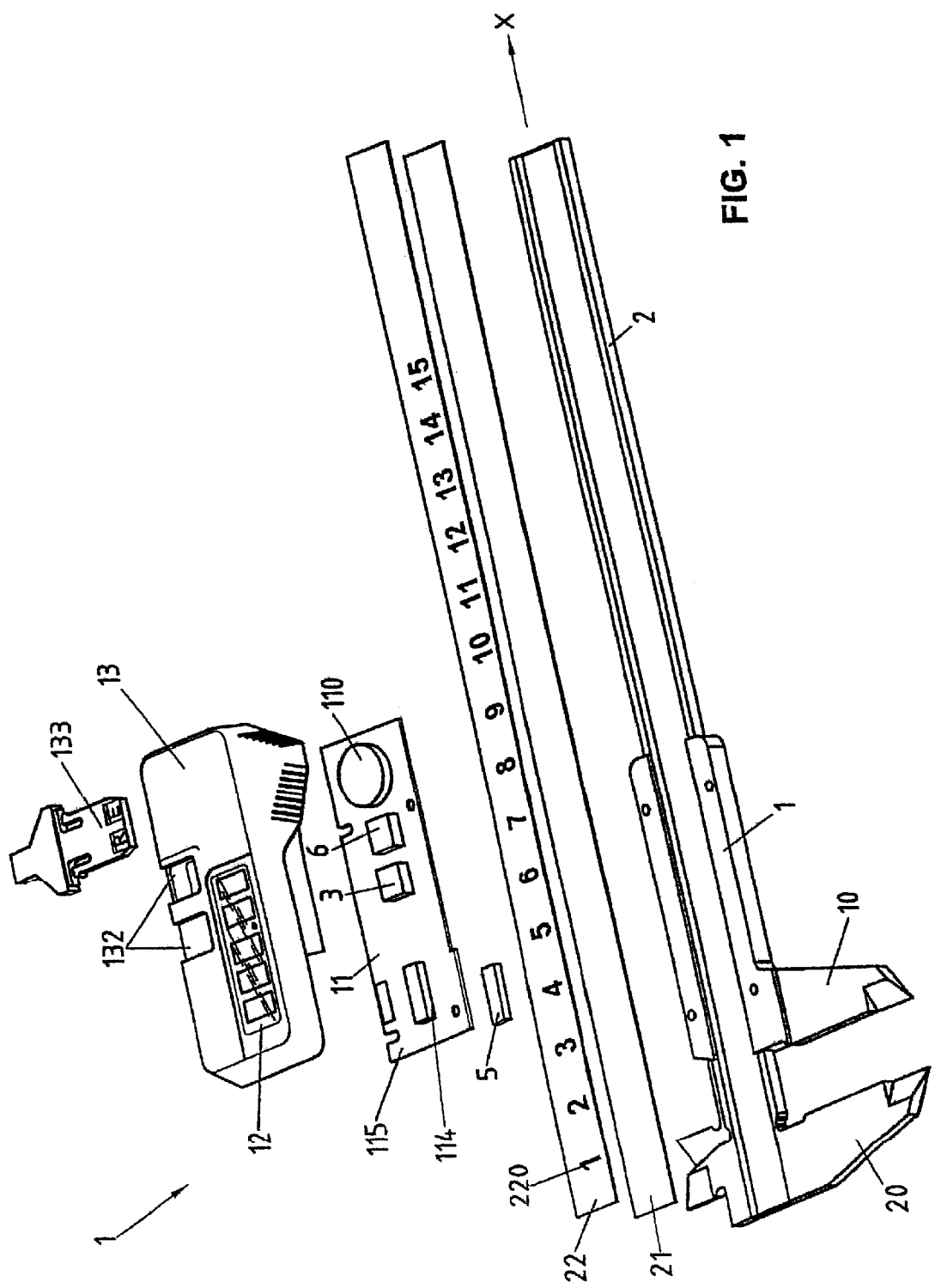
FIG. 1 represents an exploded view of a portable electronic calliper according to the present invention.

FIG. 1 is an exploded view illustrating a portable electronic caliper 15 according to the present invention. The design of such calipers is known and has been described for example in the applicant's patent application EP719999, the content of which is hereby incorporated by reference.

The caliper of the invention comprises a rod 2 and a slide 1 capable of being moved longitudinally along the rod. The slide is provided with a movable jaw 10 whereas the rod is equipped with a fixed jaw 20. A scale 21 of permanently magnetized material is fastened onto the rod 2 and provided with a series of magnetized zones. The scale 21 is covered with a protective layer of non-magnetic material 22 bearing a printed graduation 220.

Electronic means, generally indicated by the reference 11, enable an indication depending upon the distance between the caliper's jaws 10 and 20 to be displayed on an electronic LCD 12. These electronic means are assembled directly onto the printed board circuit 115. They mainly include a magneto-resistive sensor 5 assembled under the printed circuit board 115 opposite the magnetic scale 21. The sensor 5 comprises a network formed of a large number of magneto-resistive electrodes organized in groups, the value of the various resistances of the network being a periodic function of the position of the slide 1 along the rod 2. The sensor can for example be of the type described in one of the aforementioned patent documents DE4233331 or U.S. Pat. No. 5,386,642, or preferably as described in the applicant's own application published under number EP0877228, the content of which is hereby incorporated by reference. The electronic means 11 further comprise autonomous electric feeding means, a battery 110 in the example represented. The battery 110 is preferably constituted of a flat lithium battery and must guarantee the device several days, preferably even several months, of autonomous operation.

An ASIC-type electronic integrated circuit 3 determines from the resistance values of the magneto-resistive electrodes on the sensor 5 at least one parameter dependent on the distance between the jaws 10 and 20; the electronic circuit 3 is connected to a standard micro-controller 6 controlling the circuit 3 and the display 12 for displaying the distance measured. The electronic means 11 further comprise preferably a polarization magnet 114 mounted on the upper side of the printed circuit 115, opposite the sensor 5.

The electronic means 11 are protected by a housing 13, with buttons 132 to control for example the switching-on of the caliper or other functions such as resetting, adding or averaging successive measurements, etc. An opto-electronic serial connector 133 is provided as an interface between the caliper 1 and external instruments such as a printer, a PC or a machine for example.

The magneto-resistive sensor 5 comprises a large number of magneto-resistive electrodes 100, whose dimensions are chosen so as to procure a high resistance and thus to reduce the power consumption of the sensor.

The various magneto-resistive electrodes are disposed longitudinally on the sensor 5 so as to occupy various phase positions in relation to the magnetic field generated by the scale 2. At a sufficient distance of the scale 2, the magnetic field is an approximately sinusoidal function of the sensor's position on the axis x. The magnetic field produced by the scale 21 on each magneto-resistive electrode of the sensor is thus a sinusoidal function of the longitudinal position of that electrode; the resistance of each electrode evolves sinusoidally when the slide 1 is moved along the rod. The measuring circuit 3, 6 determines the position of the slide with the aid of the value of the various magneto-resistive resistances and displays this information on the display 12.

Figure 2:
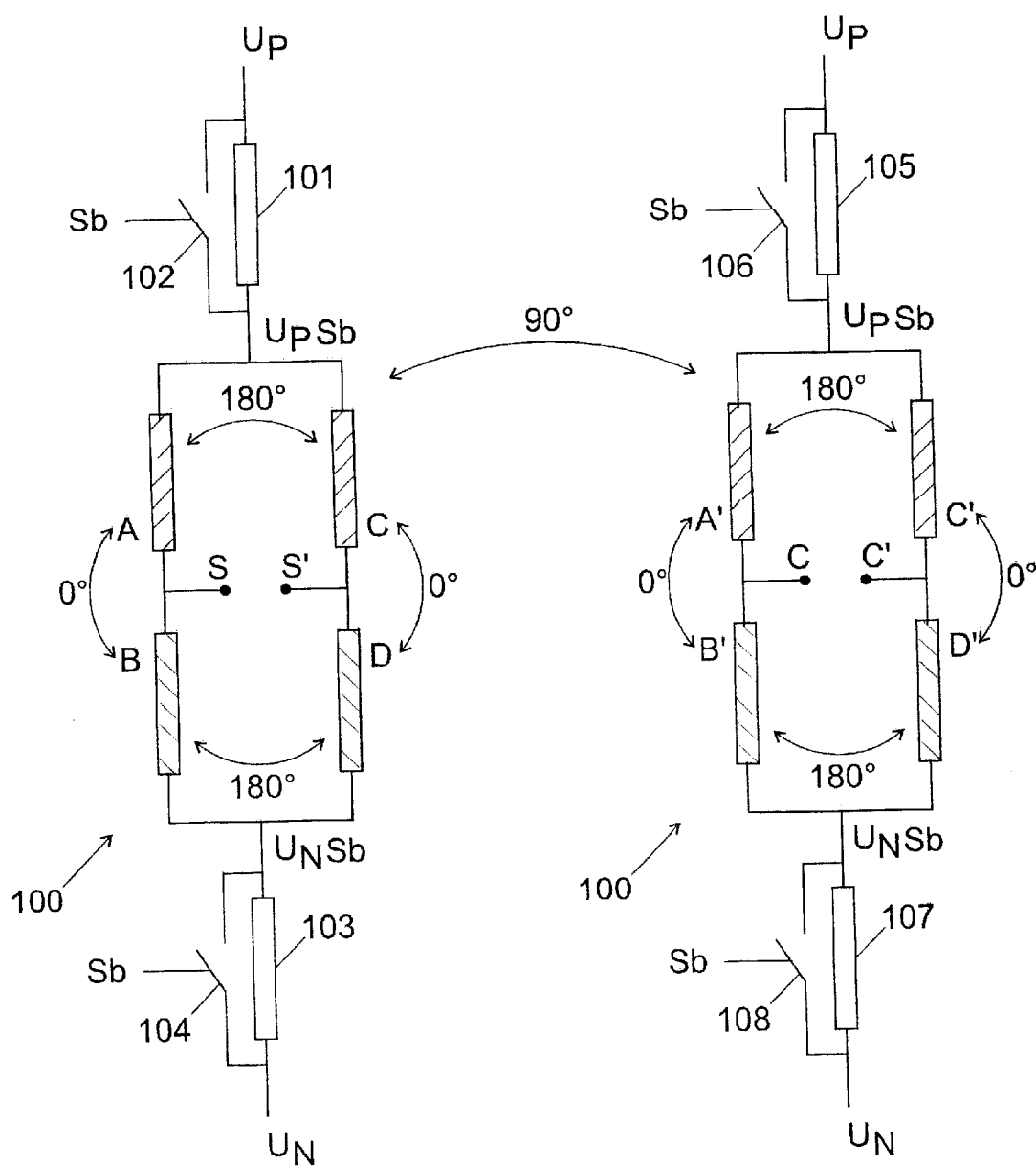
FIG. 2 shows an electrical diagram illustrating the way in which the different electrodes of the sensor are connected so as to constitute two measuring bridges.

FIG. 2 illustrates diagrammatically a preferred mode of connecting the magneto-resistive electrodes. The magneto-resistive electrodes are interconnected in this example so as to define two measuring bridges 100 (Wheatstone bridges). Each branch of the bridge is constituted of a set of several serially connected electrodes, the phase of the electrodes inside each set being identical or close. In a preferred embodiment, each set comprises electrodes positioned with spatial phase shifts of 180° but with opposite orientations of barberpole structures, for example at +45° and −45°. The corresponding electrodes of each measuring bridge are, in this example, phase-shifted by 90°. Each bridge comprises four sets of magneto-resistive electrodes ABCD, respectively A'B'C'D'. Other modes of connection, for example with one or three measuring bridges, or with different phase-shifts between the bridge's branches, can also be used within the scope of this invention.

The number of magneto-resistive electrodes per set is preferably greater than 4 but is limited only by the size of the integrated circuit 3; in one embodiment of the invention, the number of magneto-resistive electrodes per set equals 72. The total number of magneto-resistive electrodes 100 on the sensor 5, in this non-limiting embodiment having two measuring bridges composed each of 4 sets of 72 electrodes, is therefore equal to 576.

In the example illustrated by FIG. 2, the electrode set A, respectively A', is phase-shifted by 180° in relation to the electrode set C, respectively C'. Similarly, the electrode set B, respectively B', is phase-shifted by 180° in relation to the electrode set D, respectively D'. The sets A, A', C, C' occupy the same phase positions as the respective sets B, B', D, D'. The magneto-resistive electrodes of each pair AB, A'B', CD, C'D' are however provided with barberpole structures oriented in opposite directions, for example at +45° and −45°.

According to the invention, the two measuring bridges 100 are fed between the terminals $U_P$ and $U_N$ through resistances 101, 103, 105 and 107; switches 102, 104, 106 and 108 allow each resistance to be short-circuited independently. When all the switches are shut, the two measuring bridges 100 are thus directly fed with the voltages $U_P$ and $U_N$; by opening all the switches, the applied voltages pass to $u_P$sb, respectively $u_N$sb, so that the voltage difference at the terminals of the bridges diminishes and the electric consumption is reduced. In a preferred embodiment of the invention, the switches 102, 104, 106 and 108 are all controlled simultaneously by the same signal sb; it is however also possible within the framework of this invention to control these switches independently. Similarly, if several intermediate levels of consumption are useful, it is possible to feed the measuring bridges between several serial resistances that can be short-circuited independently.

When the slide 1 is moved opposite the scale 21, the measuring bridges return approximately sinusoidal differential signals c (between terminals C and C') and s (between terminals S and S') as a function of the position of the sensor, one signal being phase-shifted by 90 degrees in relation to the other. These signals are transmitted to the electronic circuit 3 which, as will be discussed below with reference to FIG. 5, amplifies them and determines the position of the sensor on the basis of these amplified signals. The electronic circuit 3 further controls the interface with the keyboard 132 as well as an optional interface with external apparatus, for example a serial interface RS232 (133).

The measuring device of the invention preferably further comprises a small parameter random-access memory (PRAM or EEPROM), not shown, for storing certain parameters, such as the choice of measurement unit, the state of the circuit, the feeding mode of the currently used measuring bridges etc. This memory zone can also be integrated into the circuit 3 or into the micro-controller 6.

A more detailed description of a possible variant embodiment of the circuit 3 is described in patent application EP0924491, the content of which is hereby incorporated by reference.

Different method for feeding the circuit of the invention will now be discussed in relation to FIGS. 3 to 12.

Figure 3:
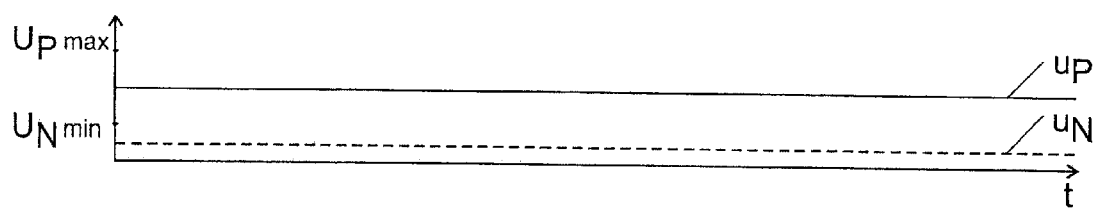
FIG. 3 represents a chronogram of the feed signals of the measuring bridges according to a first prior art embodiment.

In the prior art embodiment illustrated in FIG. 3, a continuous voltage uP of a value $U_P$max (for example 3 Volts) is supplied on the terminal $U_P$sb whereas a continuous voltage $u_N$ having a different value from the $U_N$min (for example 0 Volts) is supplied at the point $U_N$sb on the terminal $u_N$. The two measuring bridges are thus fed with a single mode using a continuous voltage $U_P$max−$U_N$min, so that the electric consumption is constant and high. This variant therefore is not suitable for use in battery-powered portable devices, for which the electric consumption represents a crucial factor.

Figure 4:
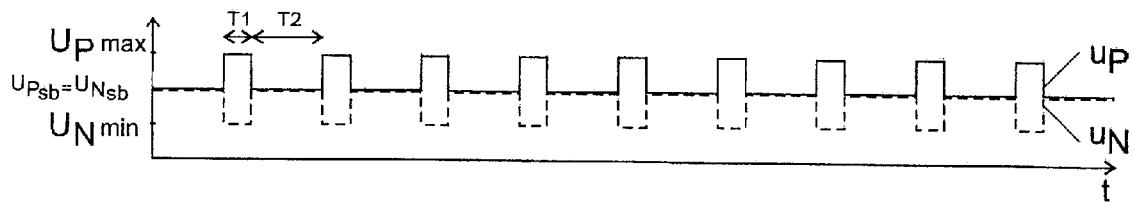
FIG. 4 represents a chronogram of the feed signals of the measuring bridges according to a second prior art embodiment.

A variant embodiment for feeding the measuring bridges with a pulsed feed mode is illustrated in FIG. 4. In this embodiment, the potential applied to the point $U_P$sb varies between the maximum potential $U_P$max and the lower potential $U_P$sb (for example between Vdd and Vdd/2). The potential of the point $U_N$sb varies between $U_N$sb=$U_P$sb and $U_N$min (for example between Vdd/2 and Vss=0 Volts). The cycle ratio is constant and equals T1/(T1+T2).

If the turn-on loss and the consumption of the sequential logic are disregarded, this feed mode enables the electric consumption to be reduced in the electrodes by a factor equal to the cycle ration. Variations in the potential at each cycle are spread between the two terminals $U_P$ and $U_N$ in order to prevent the amplifiers supplying the signals from being subjected to too great voltage surges. It is thus possible to use input amplifiers having a less critical common mode rejection rate (CMRR). Furthermore, this configuration of the variations in voltage makes it possible to reduce the consumption due to the charge/discharge of the parasitic capacities as well as the switchover time between the feeding intervals and the feed-reduction intervals, and to compensate for the cross coupling caused by the transitions of the signal $U_P$ by the complementary transitions of $U_n$.

The signals $U_p$ and $U_n$ are supplied by a sequence logic (not represented), on the basis of the clock signals of an oscillator (not represented). The cycle ratio between the feeding intervals and the feed-reduction intervals can be modified by means of appropriate control registers in the electronic circuit 3. For example, two bits in one of these registers allow four operating cycle ratios to be selected: 100% (always powered), 50%, 25% (as shown) and 0% (completely stopped).

As compared with the known continuous feed mode illustrated in FIG. 3, this variant embodiment allows to reduce the electric consumption in the electrodes. The reduction factor T1/(T1+T2) cannot however be freely chosen: during the intervals T2 of interrupted feeding, no detection of the sensor's movement is possible, so that the value displayed during these intervals can prove incorrect. Furthermore, in the frequent case where the configuration and the encoding of the electrodes do not allow an absolute but only a differential measuring of the position, the absolute position is lost when the sensor is moved during the intervals T2, which causes errors in subsequent measurements. It is therefore necessary to choose a value of T2 sufficiently low to ensure that any displacements of the sensor will be detected and that the position's reference will not be lost.

Figure 5:
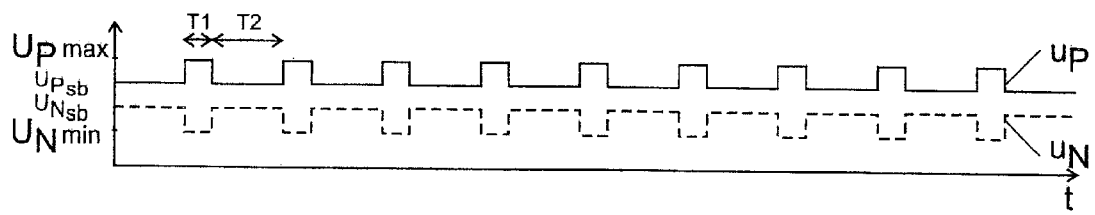
FIG. 5 represents a chronogram of the feed signals of the measuring bridges according to a first embodiment of the invention.

Another variant embodiment for feeding the measuring bridges according to the invention is illustrated in FIG. 5. In this embodiment, the measuring bridges are fed during the feeding intervals of duration T1 between the maximum potential $U_p$max and the potential $U_N$min, and during the feed-reduction intervals T2 between $U_P$sb and $U_N$sb, $U_P$sb being greater than $U_N$sb. The switchover between the feeding intervals T1 and the feed-reduction intervals T2 is effected by actuating the switches 102, 104, 106 and 108 by means of the signal sb. The measuring bridges are thus fed with a single pulsed mode in which the voltage at the terminals is always at least equal to $U_P$sb−$U_N$sb, these values being chosen so as to enable a rough measuring without interpolation of the position.

As compared with the embodiment of the prior art illustrated in FIG. 4, this solution enables the sensor's movements to be detected and the absolute position of the sensor to be retained even during the feed-reduction intervals T2. It is thus possible to chose a cycle ratio T1/(T1+T2) much lower and thus to limit the intervals T1 during which the maximum voltage is applied. The electric power consumed being proportional to the square of the voltage difference between the terminals $U_P$ and $U_N$, it is thus possible, according to the values chosen for T1, T2, $U_P$sb and $U_N$sb to obtain an additional reduction of the consumption as compared with the variant embodiment illustrated in FIG. 4.

In the embodiments illustrated so far, the measuring bridges are fed with a single continued or pulsed mode. The average consumption thus remains constant when the caliper is working, whether it is used or not. It has however been observed in the framework of this invention that the users often leave their calipers switched on for several hours, even though the effective use generally lasts only a fraction of the period during which the caliper is switched on.

A measuring device having magneto-resistive electrodes provided with a standby-mode circuit has already been described in the aforementioned patent application EP0924491. However, in this document, the magneto-resistive electrodes are fed even when the device is in standby mode; the electric consumption thus remains considerable.

Figure 6:
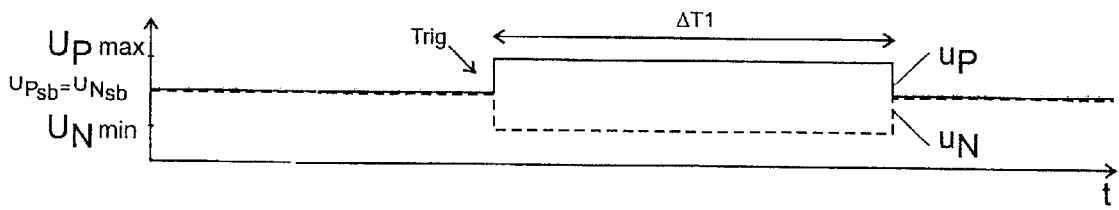
FIG. 6 represents a chronogram of the feed signals of the measuring bridges according to a second embodiment of the invention.

FIG. 6 shows a variant embodiment of the invention enabling the electric consumption to be reduced by taking into account this observation. This variant embodiment uses two feed modes of the measuring bridges. In the first mode, the measuring bridges 100 are switched off, i.e. the voltage applied at the upper terminal $U_P$sb equals the voltage applied to the lower terminal $U_N$sb.

The feeding of the measuring bridges switches to a second mode as soon as any handling of the device, for example a movement of the sensor or the actuating of a control key, is detected. In this case, a signal Trig is generated which causes, by means of a logic circuit (not represented), a change of the voltage applied on the terminals $U_P$sb and $U_N$sb, which switch over respectively to $U_P$max and $U_N$min, so that the measuring bridges are fed with a voltage sufficient to enable a fine measuring of the position with interpolation inside the measuring interval. This feed mode is held during a predefined period $\Delta T1$, then the feeding of the measuring bridges is switched off.

The signal Trig can for example be triggered as a reaction to one of the following events: actuating one of the buttons 132 of the caliper, control signal on the serial input 133 or displacement of the sensor 5 relative to the rule. This displacement can for example be detected by means of an additional magneto-resistive electrode (not represented) that stays switched on even when the measuring bridges are switched on, and whose voltage variations are measured to generate the signal Trig.

The period $\Delta T1$ will preferably be chosen sufficiently great, for example 10 minutes, to enable a measuring and reading of the result in most situations. This period is preferably lower than the waiting time before switching to standby mode or before the other functions of the caliper, for example the display, are stopped. The reading of the performed measurement is thus still possible during a limited period of time even after the feeding of the electrodes has been interrupted.

In the case of a sensor that does not allow the absolute position to be determined, the latter is preferably stored in a temporary register, for example in the position counter, during the feed-interruption intervals.

The solution shown in FIG. 6 is effective but requires an additional magneto-resistive electrode, outside the measuring bridge, and a movement-detection circuit for detecting the displacement of the sensor when the measuring bridges are switched off. These elements result in increased costs and higher electric consumption. Furthermore, the position-counting electronic means must obey specific constraints in order to keep the absolute position during switching on again of the feed voltage of the measuring bridges.

Figure 7:
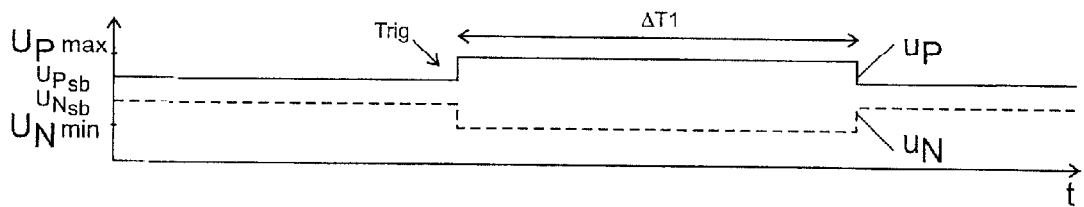
FIG. 7 represents a chronogram of the feed signals of the measuring bridges according to a third embodiment of the invention.

The feed embodiment illustrated in FIG. 7 allows these inconveniences to be remedied. According to this embodiment, the measuring bridges are fed during the feed-reduction intervals through resistances 101, 103, 105 and 107. The bridges are thus fed with a voltage equal to $U_P$sb$-U_N$sb, this difference being chosen sufficient to enable at least the detection of the movements and a rough measuring (without interpolation of the position). As soon as a displacement is detected by means of this rough measuring, or another activity is detected, a signal Trig is generated that causes the signal sb to be activated during a period $\Delta T1$ and the short-circuiting of the resistances 101, 103, 105 and 107, so that the complete voltage $U_P$max$-U_N$max is re-established at the bridges' terminals.

As compared with the embodiment illustrated in FIG. 6, this solution simplifies the generating of the signal Trig and solves the problem of loss of position reference when the measuring bridges are not fed. It is thus possibly to apply stricter conditions for generating the signal Trig and to switch to full feed mode of the measuring bridges only when displacements of sufficient amplitude and/or duration are detected. However, an electric current continues to circulate through the magneto-resistive electrodes 100 even when the caliper is in feed-reduction mode.

Figure 8:
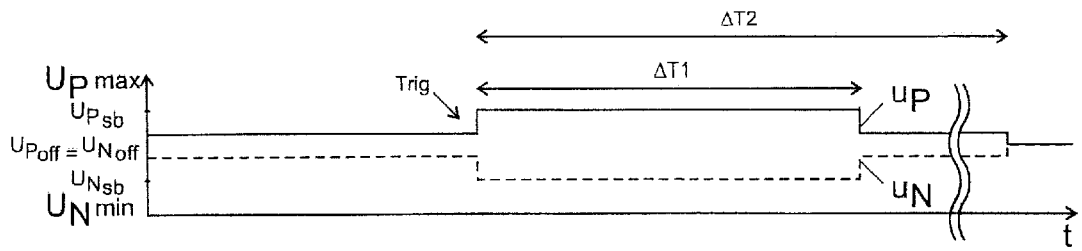
FIG. 8 represents a chronogram of the feed signals of the measuring bridges according to a fourth embodiment of the invention.

FIG. 8 illustrates an embodiment similar to that described in relation to FIG. 7, but in which the feeding of the measuring bridges is completely cut after an interval $\Delta T2$ that is longer than $\Delta T1$. This variant embodiment thus uses three different feed modes of the bridges:

"off" mode in which the feeding of the measuring bridges is totally cut when no movement has been detected for an interval $\Delta T2$;

standby mode in which the feeding of the measuring bridges is only reduced when no movement has been detected for an interval $\Delta T1$;

fine measuring mode enabling a more accurate measuring during an interval $\Delta T1$ immediately after a movement or action has been detected.

The caliper switches from the "off" mode to the standby mode or directly to the fine measuring mode for example when one of the caliper's buttons has been actuated. It is furthermore possible to put other elements of the caliper, for example the display, in standby mode or "off" mode after an interval $\Delta T3$ (not represented) greater than $\Delta T2$.

Figure 9:
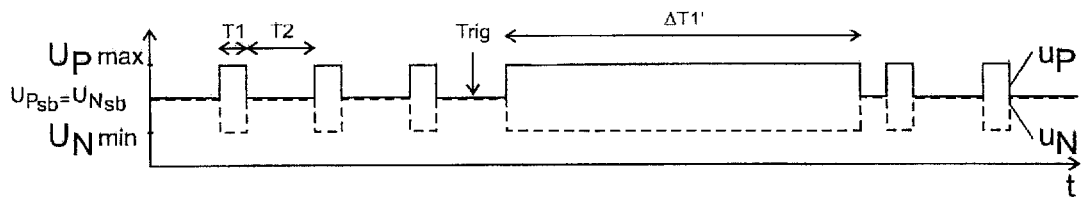
FIG. 9 represents a chronogram of the feed signals of the measuring bridges according to a fifth embodiment of the invention.

FIG. 9 illustrates another variant embodiment similar to that described in relation to FIG. 7, but in which the feeding of the measuring bridges is pulsed with a cycle ratio T1/(T1+T2) during the feed-reduction intervals, so as to enable movements to be detected and the absolute position to be kept with minimal consumption. The complete and continuous feeding of the bridges is reestablished during a period $\Delta T1'$ when, during an interval T1, a signal Trig indicating for example the detection of a movement is received.

In FIG. 9, the voltage at the terminals of the measuring bridges oscillates between ($U_P$max$-U_N$min) and 0 when the caliper is in feed-reduction mode during the intervals T1. In a non-represented variant embodiment, it would obviously also be possible to apply during these intervals a lower voltage ($U_P$sb$-U_N$sb) just sufficient for performing a rough measuring.

Figure 10:
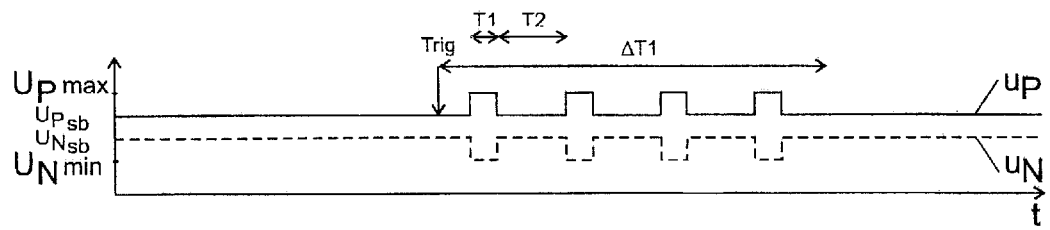
FIG. 10 represents a chronogram of the feed signals of the measuring bridges according to a sixth embodiment of the invention.

FIG. 10 illustrates another variant embodiment of the feeding similar to that described in relation to FIG. 7, but in which the feeding of the measuring bridges is pulsed with a cycle ratio T1/(T1+T2) when the bridges are in fine-measuring mode during a period $\Delta T1$. This embodiment thus enables displacements to be detected and the position to be measured with a rough accuracy at any time, a more accurate measuring being allowed only during a period $\Delta T1$ following the generating of a signal Trig indicating an actuating of the caliper.

In a preferred embodiment, the intervals of duration T1 are synchronized with the intervals during which the display 12 is refreshed, so as to allow an accurate measuring of the position during or just before the periods during which the measurement value indicated on the display is refreshed.

In the embodiment illustrated in FIG. 10, the measuring bridges are still fed with a voltage $U_P sb - U_N sb$ even when no movement is detected. The one skilled in the art will understand that it is also possible to switch to the "off" mode and to totally suppress this feeding after an interval $\Delta T1$ or $\Delta T2$ following the generating of a signal Trig.

Figure 11:
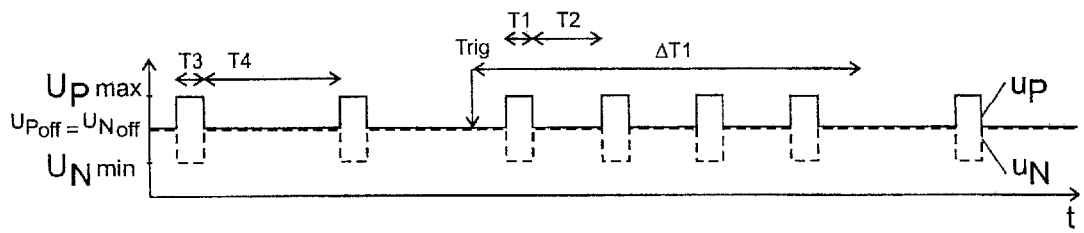
FIG. 11 represents a chronogram of the feed signals of the measuring bridges according to a seventh embodiment of the invention.

FIG. 11 illustrates another variant embodiment of the feeding of the measuring bridges similar to that described in relation to FIG. 10, but in which the measuring bridges are fed permanently with a pulsed voltage. However, the cycle ratio increases following the detection of an action indicated by the signal Trig, and switches from T3/(T3+T4) to T1/(T1+T2). In a preferred embodiment, the intervals of period T1 are synchronized with the intervals during which the display 12 is refreshed, so as to allow an accurate measuring of the position during or just before the periods during which the measurement value indicated on the display is refreshed. This embodiment thus allows a frequent updating of the measurement value displayed only when the circuit is in fine-measuring mode during a period $\Delta T1$ following the detection of an event indicated by the signal Trig.

In FIG. 11, the voltage at the bridges' terminals always oscillates between ($U_P$max$-U_N$min) and 0. In a non-represented variant embodiment, it would obviously also be possible to apply during these intervals a lower voltage ($U_P sb - U_N sb$) just sufficient for performing a rough measuring during the periods T3 when the measuring bridges are in standby mode. Furthermore, it is possible, as illustrated in FIG. 12, to not suppress totally the feed voltage during the feed-reduction intervals T2 following the engagement of the signal Trig, so as to reduce the voltage jumps and thus the capacitive losses and disturbances during accurate measurements.

Figure 12:
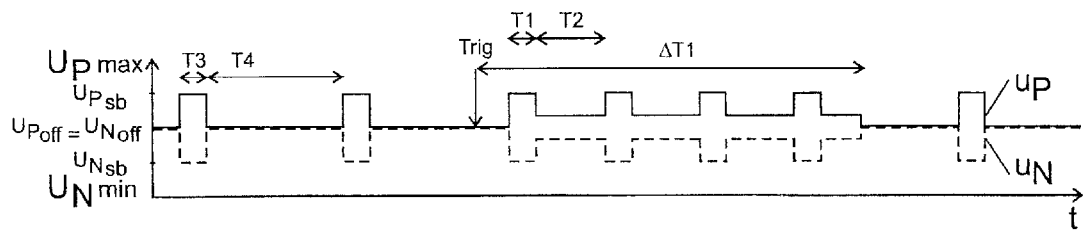
FIG. 12 represents a chronogram of the feed signals of the measuring bridges according to an eighth embodiment of the invention.

The one skilled in the art will understand that it is also possible, in the embodiments of FIGS. 11 and 12, to totally suppress the feeding of the measuring bridges after an interval $\Delta T1$ or $\Delta T2$ following the generating of a signal Trig.

In a variant embodiment, the electronic circuit 3 further comprises a frequency meter (not represented) that determines the frequency of the measuring signal, and thus the sensor's speed of displacement. According to an optional characteristic of the invention, the feed mode of the measuring bridges depends on the detected frequency, so that when the sensor moves rapidly, the cycle ratio T1/(T1+T2) increases.

The cycle ratio can further be controlled by a circuit (not represented) for detecting the charge level of the battery 110 feeding the electronic circuit: when the battery supplies a voltage below a predefined minimum, the cycle ratio or the voltage at the bridges' terminals diminishes in order to reduce the consumption.

It will be furthermore understood that the different embodiments mentioned here can be combined with one another, and that it is thus possible to device variant embodiments for feeding the magneto-resistive electrodes that use two or more distinct modes, each mode being capable of using different voltages and a continued or pulsed feeding with different cycle ratios. Furthermore, different conditions can be provided for switching from one mode to another, such as detection of a displacement or action indicated by one or several signals Trig, modification of the measuring signal's frequency, modification of the charge level of the battery, counting of a timer of variable length $\Delta T1$ and triggered from several events, for example from the signal Trig, or indications in at least one suitable control register in the circuit 3. The control register can for example indicate the measuring resolution selected by the user.

It is thus for example possible to program a same circuit to function according to different feed modes, in order for example to optimize the electric consumption according to the intended use. This programming can be performed either by software, under the control of the processor 6, or during assembly (bonding) of the sensor 5 and/or of the measuring circuit 3 on the printed circuit board 115, specific voltages being set on certain pins of the sensor and/or of the measuring circuit.

Furthermore, all the illustrated embodiments show for the sake of simplification feed signals $u_P$ and $u_N$ of rectangular shape. It will however be understood that the invention can also be applied to calipers using feed signals of any shape, for example sinusoidal, triangular, etc. It is also possible within the framework of this invention to modify the shape of the feed signals according to the mode in which the caliper is in, for example to detect displacements in standby mode by means of rectangular pulse trains, and to use feed signals of sinusoidal shape as soon as a displacement or action has been detected.

Other modes for feeding magneto-resistive electrodes 100 can be conceived according to the sensor used, for example feeding of current, non-differential feeding, etc. Furthermore, in the case of a circuit comprising several measuring bridges, it is possible within the framework of this invention to feed these different bridges according to different modes.

As mentioned, the measuring circuit 3 comprises differential input amplifiers (not represented) for amplifying the differential signals s-s' and c-c' coming from the two measuring bridges 100. In a preferred embodiment of the invention, these amplifiers can be controlled to function according to two modes that are distinguished by a different electric consumption and noise level. The amplifiers will thus preferably be controlled to function according to the low-noise and high-consumption mode only during the intervals $\Delta T1$ following the generating of the signal Trig.

Although the circuit described proves to be particularly advantageous in a measuring device of portable size, such as a slide caliper or micro-meter for example, it is naturally also possible to use it in any type of fixed or mobile device for measuring longitudinal or angular dimensions.

What is claimed is:

1. Dimension-measuring device comprising:

a scale provided with a series of magnetized areas, a sensor capable of being displaced parallel and opposite the scale and provided with a network of magneto-resistive electrodes connected so as to constitute at least one measuring bridge, a circuit for electrically feeding said at least one measuring bridge and to supply at least one value dependent on the at least one output signal to said at least one measuring bridge, said at least one measuring bridge being fed according to a first mode enabling the displacements of said sensor relative to said scale to be detected with a reduced electric consumption through said magneto-resistive electrodes, then according to at least a second mode enabling a finer measuring with a higher electric consumption in response to the detection of an action of said device, wherein the voltage applied to said at least one measuring bridge in said first mode is lower than the voltage applied to said at least one measuring bridge in said second mode, and the voltage applied to said at least one measuring bridge in said first mode is sufficient to allow displacement of said sensor with respect to said scale.

2. Device according to the preceding claim, wherein said first mode enables a rough determining of said sensor's position.

3. Device according to claim 2, wherein no current circulates through said at least one measuring bridge when it is fed according to said first mode, said device comprising at least one magneto-resistive electrodes that is not part of the bridge and being fed in said first mode, said second mode being activated as soon as a displacement of the sensor is detected by means of said at least one additional magneto-resistive electrode.

4. Device according to claim 2, said second mode being activated in response to the detection of a displacement of said sensor relative to said scale.

5. Device according to claim 2, comprising at least one control button, said second mode being activated in response to said at least one control button being actuated.

6. Device according to claim 2, wherein the feed voltage of said at least one measuring bridge is greater in said second mode than in said first mode.

7. Device according to claim 2, wherein said first mode is pulsed with a first cycle ratio and said second mode is pulsed with a second cycle ratio different from said first cycle ratio.

8. Device according to claim 2, that returns in said first mode after a predefined interval ($\Delta T1$).

9. Device according to claim 8, wherein the feeding of said measuring bridges is completely cut after a predefined interval ($\Delta T2$) following said detection of said sensor relative to said scale.

10. Device according to claim 1, comprising at least one serial interface, said second mode being activated in response to a control signal on said serial interface.

11. Device according to claim 1, wherein said first mode is pulsed and said second mode is continuous.

12. Device according to claim 1, wherein said first mode is continuous and said second mode is pulsed.

13. Device according to claim 12, comprising a display of said measurement, said display being periodically refreshed and wherein the feed intervals of said measuring bridge during the second mode are synchronized with intervals during which the display is refreshed so as to allow an accurate measuring of the position during or just before the periods during which the measurement value indicated on the display is refreshed.

14. Measuring device according to claim 1, wherein the operating cycle ratio between the feed intervals and the feed-reduction intervals depends on the frequency of the input signal.

15. Device according to claim 1, wherein the shape of the feed signals of said measuring bridges in said first and second modes is different.

16. Measuring device according to claim 1, wherein the second feed mode will depend on the speed of displacement of said sensor.

17. Measuring device according to claim 1, comprising a battery for powering it autonomously and a circuit for detecting the charge level of said battery, the second feed mode depending on said charge level.

18. Measuring device according to claim 1, comprising at least one control register and wherein the second feed mode depends on the state of at least one of said control registers.

19. Measuring device according to claim 18, wherein one of said control registers indicates the resolution selected by the user.

20. Measuring device according to claim 1, wherein the feed voltage is supplied between two external terminals of said at least one measuring bridge,
    a terminal being fed with a maximum potential and the other with a minimal potential when said at least one measuring bridge is fed,
    the two terminals being fed with an intermediate potential when the applied voltage is reduced.

21. Measuring device according to claim 20, wherein said measuring bridge is connected to said external terminals through at least one resistance, at least one switch enabling at least one of said resistances to be short-circuited when the maximum potential must be applied to said measuring bridges.

22. Dimension-measuring device comprising:
    a scale provided with a series of magnetized areas,
    a sensor capable of being displaced parallel and opposite the scale and provided with a network of magneto-resistive electrodes connected so as to constitute at least one measuring bridge,
    a circuit for electrically feeding said at least one measuring bridge and to supply at least one value dependent on the at least one output signal to said at least one measuring bridge,
    said at least one measuring bridge being fed according to a first mode enabling the displacements of said sensor relative to said scale to be detected with a reduced electric consumption through said magneto-resistive electrodes, then according to at least a second mode enabling a finer measuring with a higher electric consumption in response to the detection of an action of said device,
    wherein the voltage applied to said at least one measuring bridge in said first mode is lower than the voltage applied to said at least one measuring bridge in said second mode, and the voltage applied to said at least one measuring bridge in said first mode is sufficient to allow detecting a displacement of said sensor with respect to said scale,
    said circuit further comprising a trigger signal generator, for detecting an action on said dimension-measuring device when in said first mode,
    said circuit being arranged to switch to said second mode in response to a signal from said trigger signal generator.

* * * * *

UNITED STATES PATENT AND TRADEMARK OFFICE
CERTIFICATE OF CORRECTION

PATENT NO. : 6,724,186 B2
DATED : April 20, 2004
INVENTOR(S) : Pascal Jordil

It is certified that error appears in the above-identified patent and that said Letters Patent is hereby corrected as shown below:

Column 10,
Line 67, delete "allow displacement" and insert -- allow detecting a displacement --.

Signed and Sealed this

Twenty-seventh Day of July, 2004

JON W. DUDAS
*Acting Director of the United States Patent and Trademark Office*